United States Patent [19]

Trott et al.

[11] Patent Number: 4,863,347
[45] Date of Patent: Sep. 5, 1989

[54] BLADED ROTOR ASSEMBLIES

[75] Inventors: Michael W. Trott, Tewkesbury; Gilbert A. Turner, Cheltenham, both of England

[73] Assignee: Dowty Rotol Limited, Gloucester, England

[21] Appl. No.: 252,912

[22] Filed: Sep. 27, 1988

[30] Foreign Application Priority Data

Oct. 3, 1987 [GB] United Kingdom ............... 8723246

[51] Int. Cl.⁴ ............................................. B64C 11/40
[52] U.S. Cl. ...................................... 416/46; 416/49; 416/48; 416/154
[58] Field of Search ................. 416/154, 49, 46–48, 416/153; 91/366, 388

[56] References Cited

U.S. PATENT DOCUMENTS

| | | | |
|---|---|---|---|
| 2,703,148 | 3/1955 | Pearl | 416/154 |
| 2,869,650 | 1/1959 | Fairhurst et al. | 416/46 |
| 2,918,129 | 12/1959 | Brandes et al. | 416/47 |
| 3,051,248 | 8/1962 | Hatcher | 416/48 |
| 3,067,825 | 12/1962 | Chilman et al. | 416/154 |
| 3,229,771 | 1/1966 | Hedberg | 416/49 X |
| 3,389,641 | 6/1968 | Barnes | 416/49 X |
| 3,711,221 | 1/1973 | Almqvist | 416/49 X |
| 4,028,004 | 6/1977 | Wind | 416/49 X |
| 4,772,181 | 9/1988 | Doucher | 416/33 |

FOREIGN PATENT DOCUMENTS

| | | | |
|---|---|---|---|
| 621981 | 6/1961 | Canada | 416/46 |
| 166891 | 5/1981 | Netherlands | 416/46 |
| 706338 | 3/1954 | United Kingdom | 416/154 |
| 828858 | 2/1960 | United Kingdom | 416/46 |

Primary Examiner—Everette A. Powell, Jr.
Attorney, Agent, or Firm—Young & Thompson

[57] ABSTRACT

A bladed rotor assembly comprising:
a bladed rotor;
an actuator for effecting a change of blade pitch;
a first valve member connected to, and movable with, the actuator and having first and second passageways;
and
a second valve member co-operable with the first valve member and having first and second passageway systems formed therein for communication with the first and second passageways of the first valve member.

The first passageway system of the second valve member includes first and second independent passageways, and is provided with a valve, and a bypass incorporating a non return valve. The valve is positioned so that when in a closed position fluid is prevented from entering the first independent passageway.

12 Claims, 1 Drawing Sheet

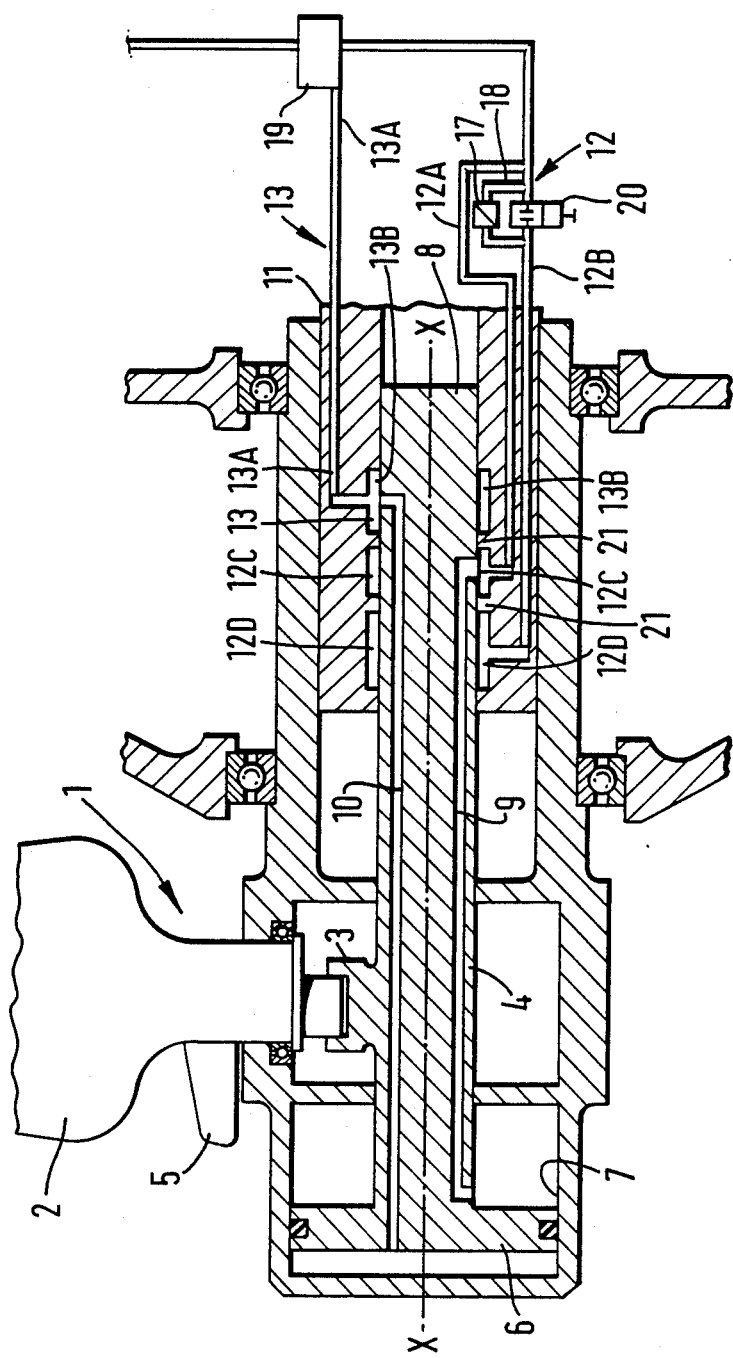

BLADED ROTOR ASSEMBLIES

This invention relates to bladed rotor assemblies and more particularly to means for controlling the pitch of such assemblies.

It is well known that the speed of an aircraft engine can be adjusted by controlling, and adjusting, when appropriate, the pitch of the individual propeller blades. In a common arrangement an engine speed governor is utilised to prompt a pitch actuator, which is operated by hydraulic means.

In the event of a failure, provisions are provided to avoid the failure endangering the aircraft. This means adequate precautions must be taken to obviate the possibility of an excessively low pitch being adopted in the event of failure.

The present invention is concerned with the provision of such precautions in propeller blade pitch change actuators which employ a blade pitch control valve (beta valve), in particular.

In accordance with the invention, there is provided a bladed rotor assembly which comprises:
   a bladed rotor;
   an actuator for effecting a change of blade pitch;
   a first valve member connected to, and movable with, the actuator and having first and second passageways, to allow respectively for the reduction or increase in the pitch of the rotor blade;
and
   a second valve member co-operable with the first valve member and having first and second passage systems therein for communication with the first and second passageways of the first valve member respectively;
wherein the first passageway system of the second valve member has first and second independent passageways, a valve provided at a position such that when the valve is in a closed position fluid present in the assembly is prevented from entering the first independent passageway, and a bypass having a non return valve to allow fluid to be transferred from the first independent passageway of the first passageway system to drain.

Further, in accordance with the invention, there is provided a bladed rotor assembly which comprises:
   a bladed rotor;
   an actuator for effecting a change of blade pitch;
   a first valve member connected to, and movable with, the actuator and having first and second passageways therein for supplying fluid to the actuator to effect pitch of the rotor blade;
and
   a second valve member co-operable with the first valve member and having first and second passageway systems therein for supplying fluid to the first and second passageways of the first valve member respectively;
wherein the first passageway system has first and second independent passageways, a valve provided at a position such that when the valve is in a closed position fluid is prevented from entering the first independent passageway, and a bypass having a non return valve to allow fluid to be transferred from the first independent passageway to a drain.

By reducing and increasing the pitch of the rotor blade the rotor blades are moved, fine and coarse respectively, by the actuator.

The provision of the valve in the first independent passageway of the first passageway system of the second valve member prevents fluid being supplied to the fine pitch side of the actuator so that the actuator is not driven to a very fine pitch during flight, and thereby prevents a dangerous over-speed situation arising.

Preferably, the first and second independent passageways of the assembly are separated from one another by a flight fine pitch stop. This pitch stop acts so as to prevent the propeller pitch from being set to a too fine a position during flight, thereby preventing an over-speed situation arising.

The valve provided in the first passageway system of the second valve member can be any form of remotely operable valve e.g. mechanical, electrical, however, is preferably an electrical operated valve.

Under normal operating conditions i.e. in flight, the valve will normally be closed so as to prevent possible fluid flow therethrough. However, the valve may be opened, preferably, by independent means to enable the assembly to operate through the second passageway.

The valve may be opened by movement of the pitch control lever, either directly or indirectly, this may be by means of a micro-switch on the pitch control lever relaying information concerning the pitch set. Therefore when the pitch control lever is moved to a certain position, or past a certain position, the valve is opened and the first passageway brought into operation.

Preferably, the valve is provided with a fail-safe, for example a spring, so that if the valve should fail it will be returned or retained in the closed position.

The actuator can usefully comprise a double acting piston movable in a cylinder and being operatively connected to each of the rotor blades, for example via a scotch yoke, to effect a change of blade pitch. In such cases, the piston can be connected via a piston rod to the first valve member or could be integral therewith.

In any event, the first valve member, often known as the beta-valve, is preferably cylindrical in shape and the second valve member, often known as the beta-sleeve, is preferably tubular in shape with an internal diameter which allows it to fit closely over the beta valve.

The first and second passageways of the first valve members may be capable of communicating with the first and second passageway systems respectively of the second valve member and capable of connecting the respective passageways or passageway systems to a source of fluid.

A single source of fluid may be used to supply the fluid to both the coarse and fine sides of the assembly. Alternatively the coarse and fine sides may be connected to separate sources of fluid.

In the alternative with a piston actuator the first source of fluid may act on one side of the piston to cause a blade coarsening effect and the second source of fluid may act on the other side of the piston to cause a blade fining effect or vice-versa.

The means of communication between the respective passageways of the first and second valve members and the source of fluid or sources of the fluid and the passageway systems of the second valve member can conveniently include annular supply galleries arranged so that the passageways in the first valve member can commmunicate with them over a predetermined range of relative movement between the valve members.

Conventionally the rotor blades will normally be biased in use towards a coarse pitch by mechanical means, for example counter-weights.

However, in the event of a failure, the invention provides a safety means to ensure the blades do not adopt an unacceptable blade pitch. To exemplify the invention, reference will now be made to the accompanying drawing which shows a schematic cross-sectional view through a bladed rotor assembly in accordance with the invention. With reference to the drawing, a bladed rotor assembly 1 has a plurality of blades 2 attached to flanges 3 of a shaft 4 and is rotatable about an axis x—x.

The bladed rotor assembly comprises a number of rotor blades 2 each biased towards a coarse pitch by mechanical means in the form of counterweights 5. The shaft 4 provides an operable connection between eah of the rotor blades 2 and a double-acting piston 6 contained within and co-operating with a cylinder 7 to form an actuator.

A first valve member 8 (beta valve) of generally cylindrical shape is connected to and rotatable with, the piston 6 via the shaft 4 (of which it forms an integral part) and has a first fluid passageway 9 formed therein to connect with one side of the piston 6 i.e. the pitch reducing or fine side.

The first valve member 8 also has passageway 10 formed therein to connect with the other side of the piston 6 i.e. the pitch increasing or coarse side.

A second valve member 11 (the beta sleeve) of generally tububular shape and such dimensions that it closely co-operates with the first valve member 8, through relative movement between the members in the direction of the axis x—x is incorporated in the assembly.

The second valve member 11 is mounted so that it does not rotate with the shaft 4 and the first valve member 8.

The second valve member is formed with a first fluid passageway system 12 connected to the pitch reducing side of the actuator and a second fluid passageway system 13 connected to the pitch increasing side of the actuator.

The first fluid pasageway system comprises two independent passageways 12A, 12B and the second passageway system comprises a singular independent passageway 13A. Each of the independent pasageways is adapted to communicate over a predetermined range with the respective passageway in the first valve member via annular grooves/galleries 12C, 12D and 13B formed therein.

The annular grooves/galleries 12C, 12D are separated by a flight fine pitch stop 21.

The other ends of the passageway systems 12 and 13 of the second valve member 11 communicate with further components of the assembly (not shown), and with a source of fluid under pressure in particular.

The source of fluid under pressure for the valve assembly may be either a common source or independent sources for the prespective passageways. In this particular embodiment a common source is described.

The fluid passes via a valve 19 to passageway systems 12 and 13 and the respective fluid lines 13A, 12A and 12B.

With regard to the first passageway system 12, the first independent passageway 12B communicates directly with annular groove/gallery 12D and the second independent passageway 12A communicates with annular groove/gallery 12C.

The first independent passageway includes a remotely operated valve 20, which when used in flight will close the line 12B preventing fluid flow therethrough into annular groove/gallery 12D.

Further, the valve 20 si bridged by a line 18 having a non return valve 17. The non return valve 17 being provided to prevent fluid flow from valve 19 to gallery 12D, but allows flow the opposite way. In addition in order to prevent the fluid pressure in the system from reaching an excessive level during operation, when the valve 20 is in a closed position the gallery 12D or the line 12B is convected to atmosphere/drain (not shown).

During flight, fluid, and therefore fluid pressure, is supplied to annular grooves/galleries 13B and 12C by their respective passageways 12A and 13A.

Where a very fine pitch is required and fluid communication via gallery 12D and the passageway 9 is desired, solenoid valve 20 is opened. Fluid is, thereby, communicated to the fine side of the beta valve assembly reducing the pitch of the propellor blades 2.

What we claim is:

1. A bladed rotor assembly which comprises:
   a bladed rotor;
   an actuator for effecting a change of blade pitch;
   a first valve member connected to, and movable with, the actuator and having first and second passageways, to allow respectively for the reduction or increase in the pitch of the rotor blade;
   and
   a second valve member co-operable with the first valve member and having first and second passageway systems therein for communication with the first and second passageways of the first valve member respectively;
   wherein the first passageway system of the second valve member has first and second independent passageways, a valve provided at a position such that when the valve is in a closed position fluid present in the assembly is prevented from entering the first independent passageway, and a bypass having a non return valve to allow fluid to be transferred from the first independent passageway of the first passageway system to drain.

2. A bladed rotor assembly which comprises:
   a bladed rotor;
   an actuator for effecting a change of blade pitch;
   a first valve member connected to, and movable with, the actuator and having first and second passageways therein for supplying fluid to the actuator to effect pitch of the rotor blade;
   and
   a second member co-operable with the first valve member and having first and second passageway systems therein for supplying fluid to the first and second passageways of the first valve member respectively;
   wherein the first passageway system has first and second independent passageways, a valve provided at a position such that when the valve is in a closed position fluid is prevented from entering the first independent passageway, and a bypass having a non return valve to allow fluid to be transferred from the first independent passageway of the first passageway to a drain.

3. An assembly as claimed in claim 1, wherein the first and second independent passageways of the assembly are separated from one another by a flight fine pitch stop.

4. An assembly as claimed in claim 1, wherein the valve provided in the first passageway system of the second valve member is a remotely operable valve.

5. An assembly as claimed in claim 1, wherein the valve provided in the first passageway system of the second valve member is an electrically operated valve.

6. An assembly as claimed in claim 1, wherein the valve is opened, by independent means to enable the assembly to operate through the second passageway.

7. An assembly as claimed in claim 1, wherein the valve is provided with a fail-safe, so that if the valve should fail it will be returned or retained in the closed position.

8. An assembly as claimed in claim 2, wherein the first and second independent passageways of the assembly are separated from one another by a flight fine pitch stop.

9. An assembly as claimed in claim 2, wherein the valve provided in the first passageway system of the second valve member is a remotely operable valve.

10. An assembly as claimed in claim 2, wherein the valve provided in the first passageway system of the second valve member is an electrically operated valve.

11. An assembly as claimed in claim 2, wherein the valve is opened, by independent means to enable the assembly to operate through the second passageway.

12. An assembly as claimed in claim 2, wherein the valve is provided with a fail-safe, so that if the valve should fail it will be returned or retained in the closed position.

* * * * *